United States Patent
Shibata et al.

(10) Patent No.: US 10,220,698 B2
(45) Date of Patent: *Mar. 5, 2019

(54) DRIVE UNIT OF HYBRID VEHICLE

(71) Applicant: TOYOTA JIDOSHA KABUSHIKI KAISHA, Toyota-shi, Aichi (JP)

(72) Inventors: Hiroyuki Shibata, Odawara (JP); Hiroyuki Shioiri, Yokohama (JP); Yuki Kurosaki, Susono (JP); Shotaro Kato, Susono (JP); Hiroki Yasui, Susono (JP); Tomohiro Abe, Susono (JP); Akira Hibino, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 65 days.

This patent is subject to a terminal disclaimer.

(21) Appl. No.: 15/434,261

(22) Filed: Feb. 16, 2017

(65) Prior Publication Data
US 2017/0240037 A1    Aug. 24, 2017

(30) Foreign Application Priority Data
Feb. 19, 2016  (JP) .................. 2016-030345

(51) Int. Cl.
*F16H 57/04*   (2010.01)
*B60K 6/365*   (2007.10)
(Continued)

(52) U.S. Cl.
CPC .............. *B60K 6/365* (2013.01); *B60K 6/383* (2013.01); *F16H 3/727* (2013.01);
(Continued)

(58) Field of Classification Search
None
See application file for complete search history.

(56) References Cited

U.S. PATENT DOCUMENTS

| 7,572,201 B2 | 8/2009 | Supina et al. |
| 8,500,589 B2 | 8/2013 | Ortmann et al. |

(Continued)

FOREIGN PATENT DOCUMENTS

| JP | H04-254047 A | 9/1992 |
| JP | 2007-202248 A | 8/2007 |

(Continued)

OTHER PUBLICATIONS

Non-Final Office Action dated Sep. 22, 2016 for the related U.S. Appl. No. 15/029,105, 13 pages.

(Continued)

*Primary Examiner* — Dirk Wright
(74) *Attorney, Agent, or Firm* — Hunton Andrews Kurth LLP

(57) ABSTRACT

A drive unit of a hybrid vehicle includes an engine; an electric motor; first and second differential mechanisms; a selectable one-way clutch; and a case accommodating the electric motor. Further, the first differential mechanism includes a first rotational element coupled to the electric motor, a second rotational element coupled to the engine, and a third rotational element that outputs power toward drive wheels, the second differential mechanism includes a sun gear coupled to the electric motor, a carrier coupled to the engine, a ring gear whose rotation is regulated by the selectable one-way clutch, and a ring gear flange that rotates integrally with the ring gear, and the selectable one-way clutch switches a state thereof between a locked state and an unlocked state, and the ring gear flange is supported by a rotor shaft of the electric motor via a radial bearing.

3 Claims, 4 Drawing Sheets

(51) Int. Cl.
  *B60K 6/383* (2007.10)
  *F16H 3/72* (2006.01)

(52) U.S. Cl.
  CPC ..... *F16H 57/0426* (2013.01); *F16H 57/0436* (2013.01); *F16H 57/0441* (2013.01); *F16H 57/0483* (2013.01); *F16H 57/0484* (2013.01); *B60Y 2200/92* (2013.01); *B60Y 2306/03* (2013.01); *B60Y 2306/09* (2013.01); *Y10S 903/911* (2013.01); *Y10S 903/913* (2013.01)

(56) References Cited

U.S. PATENT DOCUMENTS

| | | | |
|---|---|---|---|
| 9,187,087 B2 * | 11/2015 | Martin | B60W 20/40 |
| 9,188,172 B2 | 11/2015 | Fetting et al. | |
| 9,809,107 B2 * | 11/2017 | Shibata | B60K 6/365 |
| 9,851,000 B2 * | 12/2017 | Shioiri | F16H 57/045 |
| 9,884,614 B2 * | 2/2018 | Shibata | B60K 6/383 |
| 2002/0014359 A1 | 2/2002 | Schooler | |
| 2004/0176203 A1 | 9/2004 | Supina et al. | |
| 2010/0200358 A1 | 8/2010 | Eisengruber et al. | |
| 2010/0252384 A1 | 10/2010 | Eisengruber | |
| 2013/0012347 A1 | 1/2013 | Ortmann et al. | |
| 2013/0035186 A1 | 2/2013 | Martin et al. | |
| 2013/0217538 A1 | 8/2013 | Martin et al. | |
| 2015/0105205 A1 * | 4/2015 | Kurosaki | B60K 6/445 475/5 |
| 2016/0250917 A1 | 9/2016 | Shibata | |
| 2016/0375754 A1 * | 12/2016 | Kurosaki | B60K 6/383 475/5 |
| 2017/0050636 A1 * | 2/2017 | Shibata | B60W 10/08 |
| 2017/0059033 A1 | 3/2017 | Shioiri et al. | |

FOREIGN PATENT DOCUMENTS

| | | |
|---|---|---|
| JP | 2009208721 A | 9/2009 |
| JP | 2009257533 A | 11/2009 |
| JP | 2010139052 A | 6/2010 |
| JP | 2013147124 A | 8/2013 |
| JP | 2015-077846 A | 4/2015 |
| JP | 2017-044298 A | 3/2017 |
| WO | 2013111275 A1 | 8/2013 |

OTHER PUBLICATIONS

Final Office Action dated Apr. 20, 2017 for the related U.S. Appl. No. 15/029,105, 14 pages.

Notice of Allowance dated Jul. 6, 2017 for the related U.S. Appl. No. 15/029,105, 9 pages.

* cited by examiner

DRIVE UNIT OF HYBRID VEHICLE

CROSS-REFERENCE TO RELATED APPLICATION(S)

The present application claims priority to and incorporates by reference the entire contents of Japanese Patent Application No. 2016-030345 filed in Japan on Feb. 19, 2016.

BACKGROUND

The present disclosure relates to a drive unit of a hybrid vehicle.

Japanese Laid-open Patent Application No. 2015-077846 describes a drive unit of a hybrid vehicle that can cause a differential mechanism to operate as a speed-up gear, by fixing (locking) the ring gear of the differential mechanism by a selectable one-way clutch, at the time of transmitting a power output from an engine to drive wheels.

The selectable one-way clutch described above includes a plurality of struts (engagement pieces). Therefore, when the selectable one-way clutch locks the ring gear, if the struts engage unequally, a radial load is generated in the selectable one-way clutch.

In the configuration described in Japanese Laid-open Patent Application No. 2015-077846, a ring gear flange that rotates integrally with the ring gear is supported by the carrier. Therefore, the radial load generated in the selectable one-way clutch acts on the carrier via the ring gear flange, thereby causing a so-called "misalignment", in which a rotation center of the carrier deviates from its desired position. Accordingly, noise and vibration of the differential mechanism may become worse.

SUMMARY

A drive unit of a hybrid vehicle includes: an engine; an electric motor; a first differential mechanism; a second differential mechanism; a selectable one-way clutch; and a case accommodating the electric motor. Further, the first differential mechanism includes a first rotational element coupled to the electric motor, a second rotational element coupled to the engine, and a third rotational element that outputs power toward drive wheels, the second differential mechanism includes a sun gear coupled to the electric motor, a carrier coupled to the engine, a ring gear whose rotation is regulated by the selectable one-way clutch, and a ring gear flange that rotates integrally with the ring gear, and the selectable one-way clutch is configured to switch a state thereof between a locked state in which a rotation direction of the ring gear is regulated in one direction and an unlocked state in which the ring gear is allowed to rotate in both directions, and the ring gear flange is supported by a rotor shaft of the electric motor via a radial bearing.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Exemplary embodiments of a drive unit of a hybrid vehicle according to the present disclosure will be explained below in detail with reference to the accompanying drawings.

First Embodiment

Figure 1:
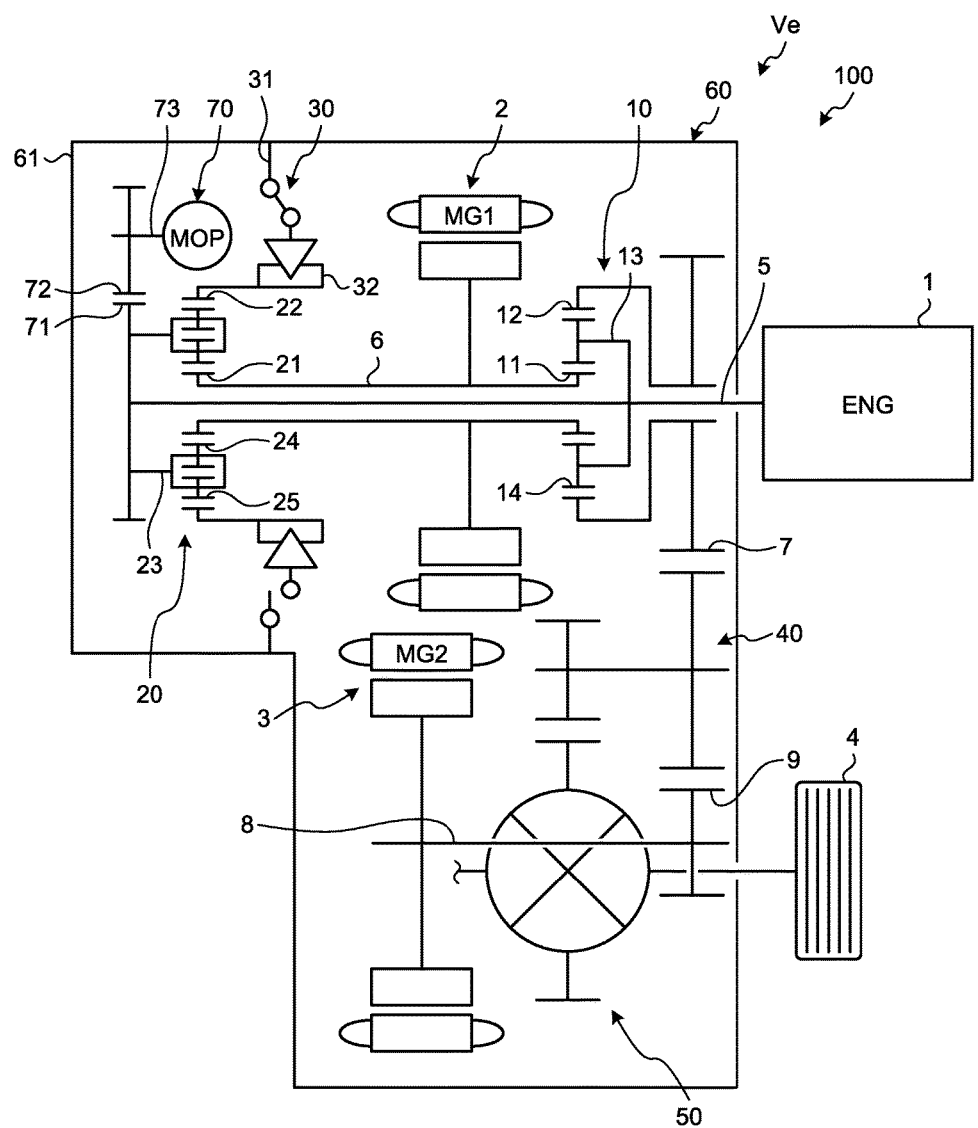
FIG. 1 is a diagram schematically illustrating a drive unit of a hybrid vehicle according to a first embodiment.

FIG. 1 is a diagram schematically illustrating a drive unit of a hybrid vehicle according to a first embodiment. As illustrated in FIG. 1, a hybrid vehicle Ve includes an engine (ENG) 1, a first motor (MG1) 2, and a second motor (MG2) 3, as power sources for driving. The engine 1 is a known internal combustion engine. Each of the motors 2 and 3 is known as a motor generator having a motor function and a power generating function. The motors 2 and 3 are electrically connected to a battery (not illustrated) via an inverter (not illustrated).

In addition to the power sources for driving (the engine 1 and the respective motors 2 and 3), a drive unit 100 of the hybrid vehicle Ve includes a first differential mechanism 10 as a power dividing mechanism, a second differential mechanism 20 as a transmission, a selectable one-way clutch (hereinafter, "SOWC") 30, a counter gear mechanism 40, and a differential gear mechanism 50.

A power output by the engine 1 is divided into the side of the first motor 2 and the side of drive wheels 4 by the first differential mechanism 10. At the time of transmitting engine torque to the drive wheels 4, the SOWC 30 receives an engine reaction force and the second differential mechanism 20 functions as a speed-up gear. Further, the first motor 2 is caused to function as a power generator by the power divided to the side of the first motor 2, and the first motor 2 charges a battery with the generated power or supplies the generated power to the second motor 3. The second motor 3 is then caused to function as a motor by the power.

Specifically, in the drive unit 100, the first motor 2, the first differential mechanism 10, the second differential mechanism 20, and the SOWC 30 are arranged on the same axis of the engine 1 (a crankshaft). An input shaft 5 is coupled to the crankshaft of the engine 1. As illustrated in FIG. 1, the drive unit 100 is accommodated in a case 60, and the first differential mechanism 10, the first motor 2, and the second differential mechanism 20 are arranged sequentially from the side of the engine 1 in an axial direction. The second motor 3 is arranged on an axis different from the axis of the engine 1. It should be noted that the axial direction herein refers to an axial direction of the crankshaft (i.e., the axial direction of the input shaft 5).

The first differential mechanism 10 is a single pinion-type planetary gear mechanism in the example illustrated in FIG. 1. The first differential mechanism 10 includes, as three rotational elements, a first sun gear 11, a first ring gear 12 arranged on a concentric circle with respect to the first sun gear 11, and a first carrier 13 that holds a pinion gear 14 engaged with the first sun gear 11 and the first ring gear 12 so that the pinion gear 14 being capable of rotation and revolution.

The first motor 2 is coupled to the first sun gear 11, the first sun gear 11 being a first rotational element, and the first sun gear 11 and a first rotor shaft 6 of the first motor 2 rotate integrally with each other. The first rotor shaft 6 is a hollow shaft, and the input shaft 5 is inserted in the hollow shaft. The engine 1 is coupled to the first carrier 13, the first carrier 13 being a second rotational element, and the first carrier 13 and the input shaft 5 rotate integrally with each other. The first ring gear 12, which is a third rotational element, is an output element that outputs a torque from the first differential mechanism 10 to the side of the drive wheels 4. An output gear 7 is coupled to the first ring gear 12 so as to rotate integrally with each other.

The output gear 7 is coupled to the differential gear mechanism 50 via the counter gear mechanism 40. Therefore, a power output from the output gear 7 is transmitted to the right and left drive wheels 4 via the counter gear mechanism 40 and the differential gear mechanism 50.

In the drive unit 100, the torque output by the second motor 3 can be added to the torque transmitted from the engine 1 to the drive wheels 4. The second motor 3 includes a second rotor shaft 8 arranged in parallel with the input shaft 5. A reduction gear 9 engaged with a driven gear of the counter gear mechanism 40 is attached to the second rotor shaft 8 so as to rotate integrally with each other.

The second differential mechanism 20 is a double pinion-type planetary gear mechanism in the example illustrated in FIG. 1. The second differential mechanism 20 includes, as three rotational elements, a second sun gear 21, a second ring gear 22 arranged on a concentric circle with respect to the second sun gear 21, and a second carrier 23 that holds a first pinion gear 24 and a second pinion gear 25 so that the second pinion gear 25 being capable of rotation and revolution. The first pinion gear 24 engages with the second sun gear 21, and the second pinion gear 25 engages with the first pinion gear 24 and the second ring gear 22. The first pinion gear 24 and the second pinion gear 25 are respectively provided in plural numbers.

The first motor 2 is coupled to the second sun gear 21, and the second sun gear 21 and the first rotor shaft 6 rotate integrally with each other. The engine 1 is coupled to the second carrier 23, and the second carrier 23 and the input shaft 5 rotate integrally with each other. In the drive unit 100, the first sun gear 11 and the second sun gear 21 rotate integrally with each other, and the first carrier 13 and the second carrier 23 rotate integrally with each other.

The second ring gear 22 rotates integrally with a notch plate 32, the notch plate 32 being a rotation side member of the SOWC 30. The second ring gear 22 is selectively fixed by the SOWC 30. The SOWC 30 includes a pocket plate 31, the pocket plate 31 being a fixed side member fixed to the case 60. The SOWC 30 functions as a mechanism that receives an engine reaction force by locking the second ring gear 22.

The SOWC 30 switches a state between a locked state in which the rotation direction of the second ring gear 22 is regulated in only one direction, and an unlocked state in which the second ring gear 22 can rotate in both directions. In the drive unit 100, when the SOWC 30 is in the locked state, a rotation of the second ring gear 22 is regulated (limited) in a forward direction. The forward direction is the direction same as the rotation direction of the engine 1.

The second carrier 23 rotates integrally with a pump drive gear 71 of an oil pump (MOP) 70. The oil pump 70 is arranged on an axis different from the axis of the engine 1, and is driven by the power output from the engine 1. Further, the pump drive gear 71 engages with a pump driven gear 72 that is attached to a pump shaft 73. The oil pump 70 is driven by a rotation of the pump shaft 73, and oil discharged from the oil pump 70 is supplied to lubrication requiring portions such as the first differential mechanism 10, the second differential mechanism 20, and the SOWC 30 in the case 60.

A rear cover 61 is provided in a part of the case 60 opposite to the engine 1. The rear cover 61 is a body different from the main body (for example, having a cylindrical shape) of the case 60, and is integrated with the main body of the case 60 by fastening a bolt or the like on matching surfaces.

Figure 2:
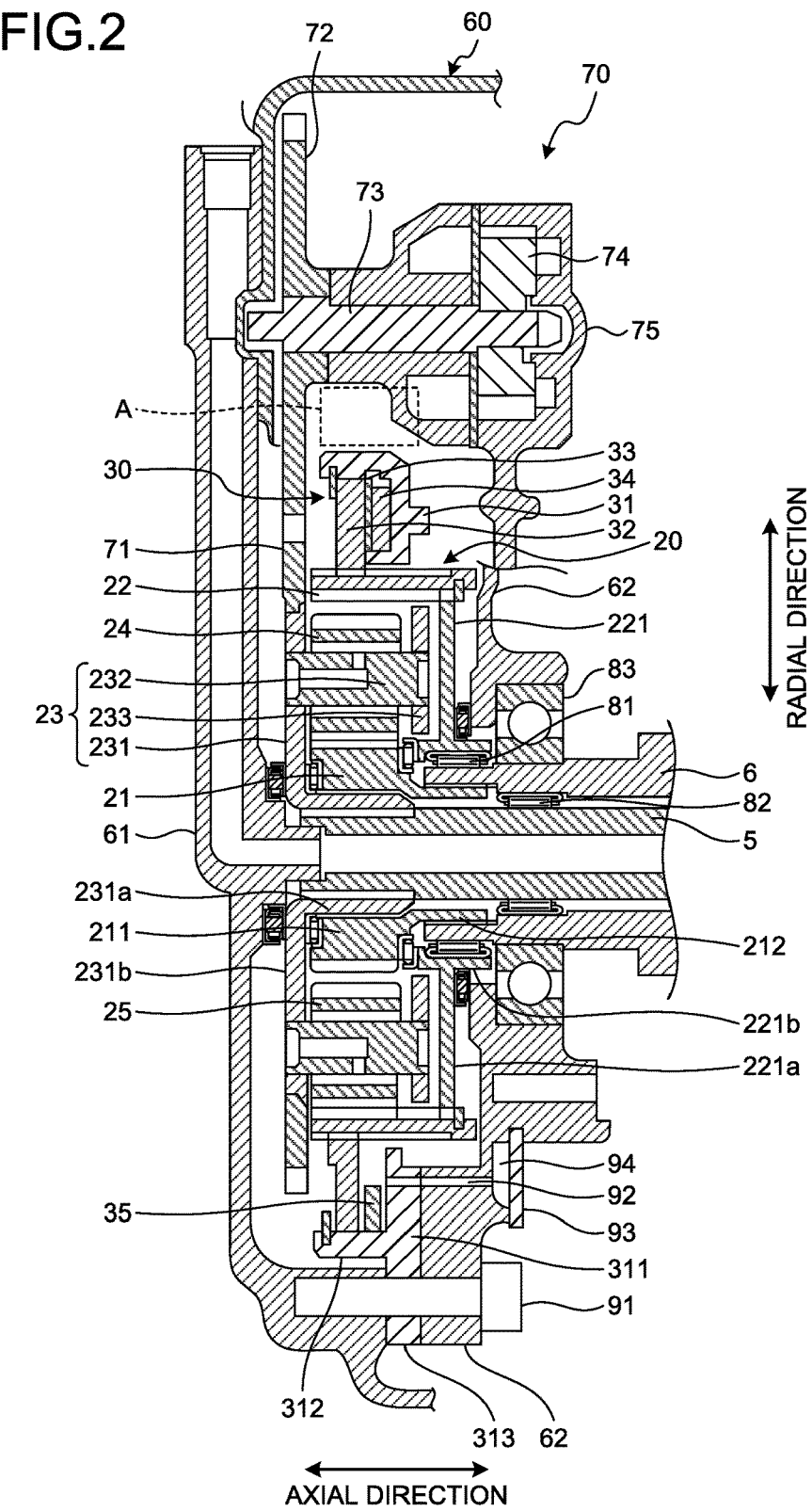
FIG. 2 is a cross-sectional view schematically illustrating a peripheral structure of a second differential mechanism inside a case.

The structure of the drive unit 100 is described next in more detail with reference to FIG. 2. FIG. 2 is a cross-sectional view schematically illustrating a peripheral structure of the second differential mechanism 20 according to the first embodiment. As illustrated in FIG. 2, the drive unit 100 according to the first embodiment has a structure in which the second ring gear 22 of the second differential mechanism 20 is supported by the first rotor shaft 6 via a support member (a ring gear flange 221 and a needle bearing 81 described later).

Although the engine 1 is not illustrated in FIG. 2, when an axial position (arrangement) of the members included in the drive unit 100 is explained, the axial position is relatively specified by using expressions "side of the engine 1" and "side of the rear cover 61". The rear cover 61 includes a portion extending in the axial direction; however, the rear cover 61 forms a partition wall in the case 60 on the opposite side to the engine 1. Therefore, the "side of the engine 1" means that the axial position is relatively on the side of the engine 1 (the right side in FIG. 2). On the other hand, the "side of the rear cover 61" means that the axial position is relatively on the opposite side to the engine 1 (the left side in FIG. 2).

As illustrated in FIG. 2, a needle bearing 82, which is a bearing (a radial bearing) that receives a radial load, is provided between an inner periphery of the first rotor shaft 6 and an outer periphery of the input shaft 5. The input shaft 5 is supported by the first rotor shaft 6 via the needle bearing 82, and one end side of the input shaft 5 protrudes from the first rotor shaft 6 to the side of the rear cover 61.

The second carrier 23 of the second differential mechanism 20 is spline-fitted to a portion of the input shaft 5, where the input shaft 5 being extended to the side of the rear cover 61 beyond the first rotor shaft 6. The second carrier 23 includes a carrier main body 231 that is spline-fitted to the outer periphery of the input shaft 5, a pinion shaft 232 that rotatably supports the first pinion gear 24 and the second pinion gear 25, and a carrier plate 233 formed in an annular shape.

The carrier main body 231 is formed in an annular shape, and a boss portion 231a formed on an inner periphery of the carrier main body 231 is spline-fitted to the input shaft 5. A carrier flange 231b extending from the side of the rear cover 61 of the boss portion 231a toward outside in a radial direction is provided in the carrier main body 231. The carrier flange 231b is arranged between the second sun gear 21 and the rear cover 61 in the axial direction. The pump drive gear 71 of the oil pump 70 is integrally formed on the outer periphery of the carrier flange 231b.

The pinion shaft 232 is arranged to be parallel to the input shaft 5, where one end of the pinion shaft 232 is attached to the carrier flange 231b, and the other end of the pinion shaft 232 is attached to the carrier plate 233. That is, the carrier plate 233 is arranged on the side opposite to the carrier flange 231b with respect to the pinion shaft 232, the first pinion gear 24, and the second pinion gear 25.

The power output from the engine 1 is transmitted to the oil pump 70 via the second carrier 23 (only the carrier main body 231). The oil pump 70 includes the pump drive gear 71, the pump driven gear 72, the pump shaft 73, a pump rotor 74, and a pump body 75.

The pump driven gear 72 engaged with the pump drive gear 71 rotates integrally with the pump shaft 73 and the pump rotor 74. The pump shaft 73 is arranged to be parallel to the input shaft 5, and the pump driven gear 72 is attached to the pump shaft 73 on the side of the rear cover 61, and the pump rotor 74 is attached to the pump shaft 73 on the side of the engine 1. The pump rotor 74 is provided in the pump body 75, and is arranged on the side of the engine 1 with respect to the second differential mechanism 20 in the axial direction. That is, in the drive unit 100, the pump rotor 74 and the second differential mechanism 20 are arranged at different positions in the axial direction.

The pump body 75 is integrated with a center support 62 that is fixed to the case 60. That is, the pump body 75 and the center support 62 are formed by an integrally molded member. The center support 62 is a partition wall that defines an internal space of the case 60, and is a support member that supports a rotary member inside the case 60. As illustrated in FIG. 2, the center support 62 is a separate member from the rear cover 61, and is fastened to an end (a flange portion or the like) on the side of the rear cover 61 by a bolt 91 and is integrated with the rear cover 61 (the case 60).

A roller bearing 83 as a radial bearing is provided between the center support 62 and the first rotor shaft 6. That is, the first rotor shaft 6 is rotatably supported by the center support 62 via the roller bearing 83. An outer race of the roller bearing 83 is fitted to a through hole of the center support 62, and an inner race of the roller bearing 83 is fitted to an outer periphery of the first rotor shaft 6.

The roller bearing 83 and the needle bearing 82 are arranged at the same position in the axial direction (at a position overlapped on each other). As illustrated in FIG. 2, the needle bearing 82 is fitted to an inner peripheral side of a portion of the first rotor shaft 6 to which the roller bearing 83 is fitted.

Furthermore, the first rotor shaft 6 is extended to the side of the rear cover 61 beyond a portion to which the roller bearing 83 and the needle bearing 82 are fitted, and an end portion (one end portion) of the first rotor shaft 6 is located near a gear portion 211 of the second sun gear 21.

The second sun gear 21 is spline-fitted on the side of the rear cover 61 (to the one end side) of the first rotor shaft 6 with respect to a portion to which the needle bearing 82 is fitted. The second sun gear 21 includes the gear portion 211 that is arranged on the side of the rear cover 61 with respect to the one end of the first rotor shaft 6 and a boss portion 212 axially projecting from the inner periphery of the gear portion 211 toward the engine 1. An outer periphery of the boss portion 212 is spline-fitted to the inner periphery of the first rotor shaft 6.

Furthermore, the ring gear flange 221 of the second differential mechanism 20 is attached to the first rotor shaft 6 on the side of the rear cover 61 with respect to a portion of the first rotor shaft 6 to which the roller bearing 83 is fitted via the needle bearing 81.

The ring gear flange 221 is a member that rotates integrally with the second ring gear 22 and supports the second ring gear 22. As illustrated in FIG. 2, the ring gear flange 221 is arranged radially inside of the second ring gear 22, and is supported by the first rotor shaft 6 via the needle bearing 81. The ring gear flange 221 includes a flange portion 221a whose outer periphery is spline-fitted to the inner periphery of the second ring gear 22 and a boss portion 221b whose inner periphery fitted to the outer race of the needle bearing 81.

Specifically, the flange portion 221a extends radially outside from the boss portion 221b, and is arranged in the axial direction between the carrier plate 233 of the second carrier 23 and the center support 62. That is, the ring gear flange 221 is arranged on the side of the engine 1 with respect to the carrier plate 233. Further, the second ring gear 22 is supported by the first rotor shaft 6 via the ring gear flange 221 and the needle bearing 81. In the drive unit 100, the radial load that acts on the second ring gear 22 from the SOWC 30 described later is received by the needle bearing 81 (the first rotor shaft 6) via the ring gear flange 221.

Furthermore, in the axial direction, the portion where the second ring gear 22 and the ring gear flange 221 are spline-fitted to each other (a spline-fitted portion) is located on the side of the engine 1 with respect to a portion where the second ring gear 22 and the second pinion gear 25 are engaged with each other (an engaging portion).

Further, as illustrated in FIG. 2, the SOWC 30 is arranged radially outside of the second differential mechanism 20. An axial length of the SOWC 30 is less than the axial length of the second differential mechanism 20. The SOWC 30 is arranged at a position where the SOWC 30 is overlapped on the second differential mechanism 20 in the axial direction, and the notch plate 32 is spline-fitted to the outer periphery of the second ring gear 22. The SOWC 30 includes the pocket plate 31 that is a fixed-side member, the notch plate 32 that is a rotation side member, a selector plate 33 that is a member to switch the state of the SOWC 30 between the locked state and the unlocked state, and struts 34 as engagement pieces.

The pocket plate 31 is formed such that an annular plate portion 311, a cylindrical portion 312, and a flange portion 313 are formed in an integral structure, and is fastened to the rear cover 61 by the bolt 91. The flange portion 313 protrudes radially outside from the cylindrical portion 312 and is fastened to the flange portion (a matching surface) of the rear cover 61 together with the center support 62 by the bolt 91. Further, the plate portion 311 is formed in an annular shape extending radially inside from the cylindrical portion 312, and faces the notch plate 32 and the selector plate 33 in the axial direction. The notch plate 32 and the selector plate 33 are arranged inside of the cylindrical portion 312. Further, a plurality of pockets that respectively accommodate therein the struts 34 engaging with the notch plate 32 are provided in the pocket plate 31 (the plate portion 311). Elastic members (not illustrated) that bias the struts 34 toward the notch plate 32 are provided between the struts 34 and the bottom of the pockets.

A plurality of engaging concave portions (notches) engaged with the struts 34 are provided in the notch plate 32. The selector plate 33 is arranged between the notch plate 32 and the pocket plate 31 (the plate portion 311). Window holes (not illustrated) through which the struts 34 on the side of the pocket plate 31 can project toward the notch plate 32 are provided in the selector plate 33. The selector plate 33 is an annular plate member provided with a plurality of the window holes that axially penetrate the selector plate 33, and is coupled to an actuator (not illustrated) via an arm 35. By transmitting a power output from the actuator to the selector plate 33 via the arm 35, the selector plate 33 relatively rotates with respect to the pocket plate 31 and the notch plate 32.

The state of the SOWC 30 is switched between a state in which the struts 34 are accommodated in the pockets of the pocket plate 31 (the unlocked state) and a state in which the struts 34 are raised to the side of the notch plate 32 through the window holes in the selector plate 33 (the locked state). For example, in the unlocked state, the struts 34 are in an accommodated state in which the struts 34 are pushed into the inside of the pockets on the side of the pocket plate 31 by non-window hole portions of the selector plate 33. Therefore, the notch plate 32 does not engage with the struts 34, and can rotate in both directions. On the other hand, in the locked state, the struts 34 are in an upright state in which the struts 34 are raised to the side of the notch plate 32 through the window holes of the selector plate 33. Therefore, the struts 34 engage with the notch plate 32, and the rotation direction of the notch plate 32 is regulated to one direction.

The struts 34 are provided at positions with a predetermined interval in a circumferential direction of the pocket plate 31 (the plate portion 311). That is, a plurality of engaging concave portions is provided in the notch plate 32 at circumferential positions corresponding to the struts 34. Therefore, when the SOWC 30 is in the locked state, all the struts 34 do not necessarily engage with (mesh with) the notch plate 32 evenly, and thus if the respective struts 34 mesh with the notch plate 32 unevenly, a radial load is generated. Even if the SOWC 30 is in the locked state, any one of the struts 34 may not engage with the notch plate 32. In such a case, a moment that causes the center of the notch plate 32 to become eccentric is generated, and the radial load is generated in the SOWC 30.

The radial load generated in the SOWC 30 acts on the second ring gear 22 from the notch plate 32. In the drive unit 100, because the ring gear flange 221 is supported by the first rotor shaft 6 via the needle bearing 81, the radial load acts on the needle bearing 81 and the first rotor shaft 6. That is, the radial load generated in the SOWC 30 can be received by the needle bearing 81 and the first rotor shaft 6. That is, according to the drive unit 100, the radial load (an eccentric load) generated in the SOWC 30 does not act on the second carrier 23 from the ring gear flange 221, a misalignment of the second carrier 23 can be suppressed (controlled). Accordingly, noise and vibration of the second differential mechanism 20 can be reduced.

Furthermore, as illustrated in FIG. 2, in the axial arrangement relationship between the oil pump 70 and the SOWC 30, the pump drive gear 71 and the pump driven gear 72 are arranged on the side of the rear cover 61 with respect to the SOWC 30 and the second ring gear 22. That is, the pump drive gear 71 is not arranged radially inside of the SOWC 30. Therefore, in the drive unit 100, an oil path 92 that supplies the lubricant oil to the inside of the SOWC 30 is provided radially inside of the outer periphery of the pump drive gear 71. The oil path 92 passes through the plate portion 311 of the pocket plate 31 and the center support 62, and is communicated with an oil reservoir 94 defined by one wall surface (on the side of the engine 1) of the center support 62 and a partition member 93. A feed port of the oil path 92 is formed on an inner surface of the plate portion 311 and is open to the inside of the SOWC 30, and is located radially inside of the outer periphery of the pump drive gear 71. Accordingly, a supply pressure of the lubricant oil to the SOWC 30 can be reduced, thereby enabling to reduce a loss. That is, the supply pressure of the lubricant oil is set to be greater than the inner pressure due to the centrifugal force during high speed rotation of the SOWC 30 (the notch plate 32). Therefore, by providing the oil path 92 radially inside where the centrifugal force is small, the supply pressure can be reduced. The oil path 92 is formed in a portion where the plate portion 311 and the center support 62 come into contact with each other.

As described above, in the drive unit 100 according to the first embodiment, because the ring gear flange 221 is supported by the first rotor shaft 6 via the needle bearing 81, the radial load generated in the SOWC 30 can be received by the needle bearing 81 and the first rotor shaft 6. Accordingly, an occurrence of misalignment of the second carrier 23 due to the radial load can be suppressed, thereby enabling to reduce noise and vibration of the second differential mechanism 20.

For example, according to the conventional structure described in Japanese Laid-open Patent Application No. 2015-077846, the ring gear flange of the second differential mechanism is supported by a boss portion of the second carrier. The boss portion of the second carrier is spline-fitted to the input shaft. Therefore, if a radial load acts on the second carrier from the ring gear flange, the misalignment corresponding to the amount of play of the spline occurs in the second carrier. On the other hand, according to the first embodiment, the misalignment of the second carrier that occurs in the conventional structure can be suppressed.

The pump body 75 and the center support 62 are formed in an integral structure, and the pump rotor 74 is arranged at a position different from the position of the SOWC 30 in the axial direction. Therefore, as indicated by a broken line in FIG. 2, it is possible to create (provide) a space A radially outside of the second differential mechanism 20 and the SOWC 30 inside of the case 60. By utilizing the space A, the radial size of the SOWC 30 can be increased, thereby enabling to improve the durability of the SOWC 30. If the radial size of the SOWC 30 is small, the circumferential force (load) received by the respective struts 34 increases. However, if the radial size of the SOWC 30 is large, the load can be reduced, and thus the durability of the SOWC 30 is improved.

Further, the first embodiment has a structure in which the ring gear flange 221 is not supported by the rear cover 61, and thus excitation of membrane oscillation of the rear cover 61 that occurs due to an engagement transmission error of the second differential mechanism 20 can be suppressed. Accordingly, noise generation due to vibration of the rear cover 61 caused by the engagement transmission error of the second differential mechanism 20 can be suppressed.

Second Embodiment

A drive unit 100 according to a second embodiment is described with reference to FIGS. 3 and 4. In the second embodiment, unlike the first embodiment, the ring gear flange 221 is supported by the rear cover 61. In the descriptions of the second embodiment, repeated explanations of the elements same as the elements in the first embodiment described above are omitted and reference characters of the elements described in the first embodiment are used for the same elements.

Figure 3:
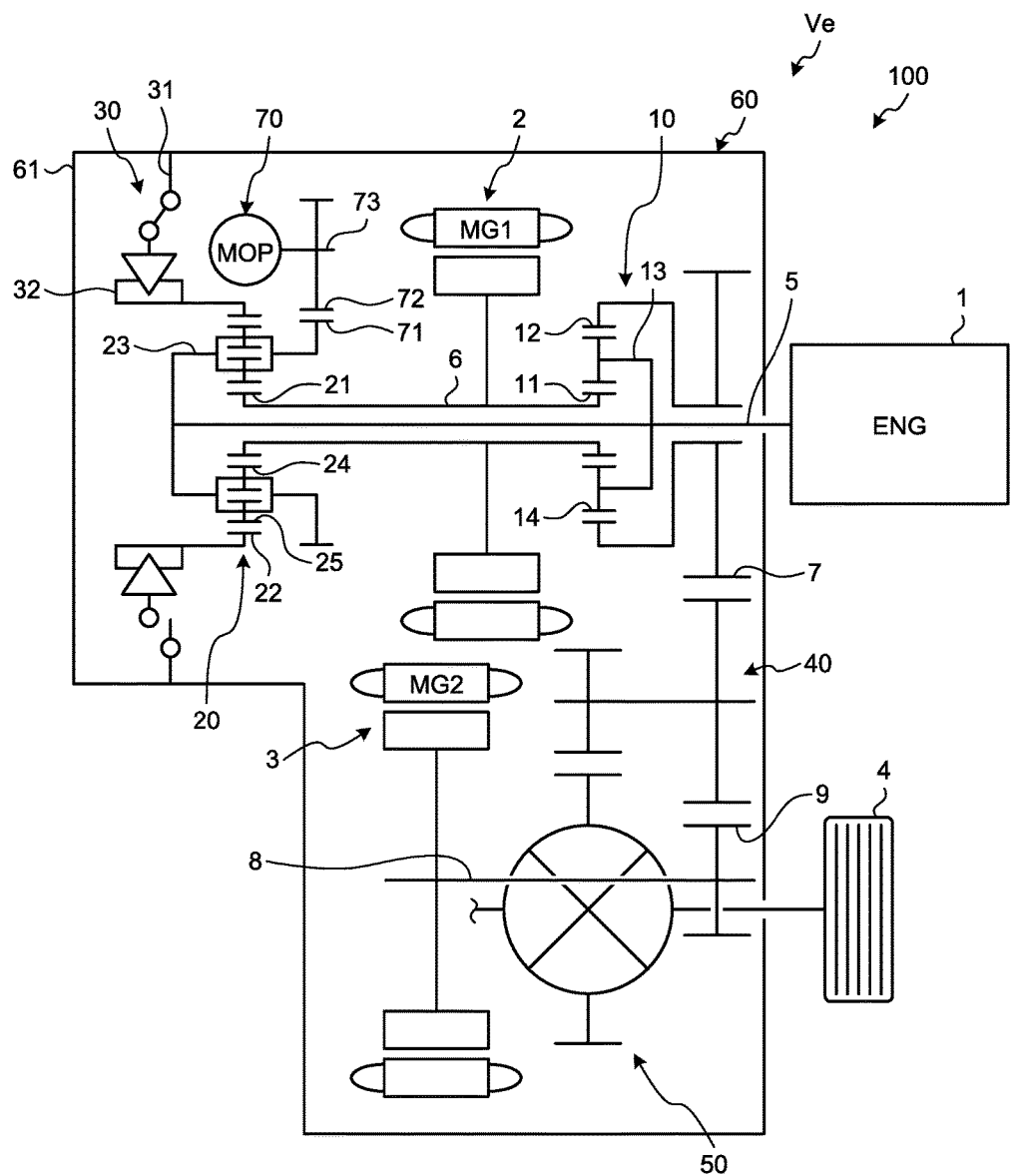
FIG. 3 is a diagram schematically illustrating a drive unit of a hybrid vehicle according to a second embodiment.

FIG. 3 is a skeleton diagram schematically illustrating a vehicle equipped with a drive unit 100 according to the second embodiment. As illustrated in FIG. 3, in the second embodiment, in the axial direction, the pump drive gear 71 and the pump driven gear 72 are arranged between the first motor (on the side of the engine 1) 2 and the second differential mechanism 20 (on the side of the rear cover 61).

Figure 4:
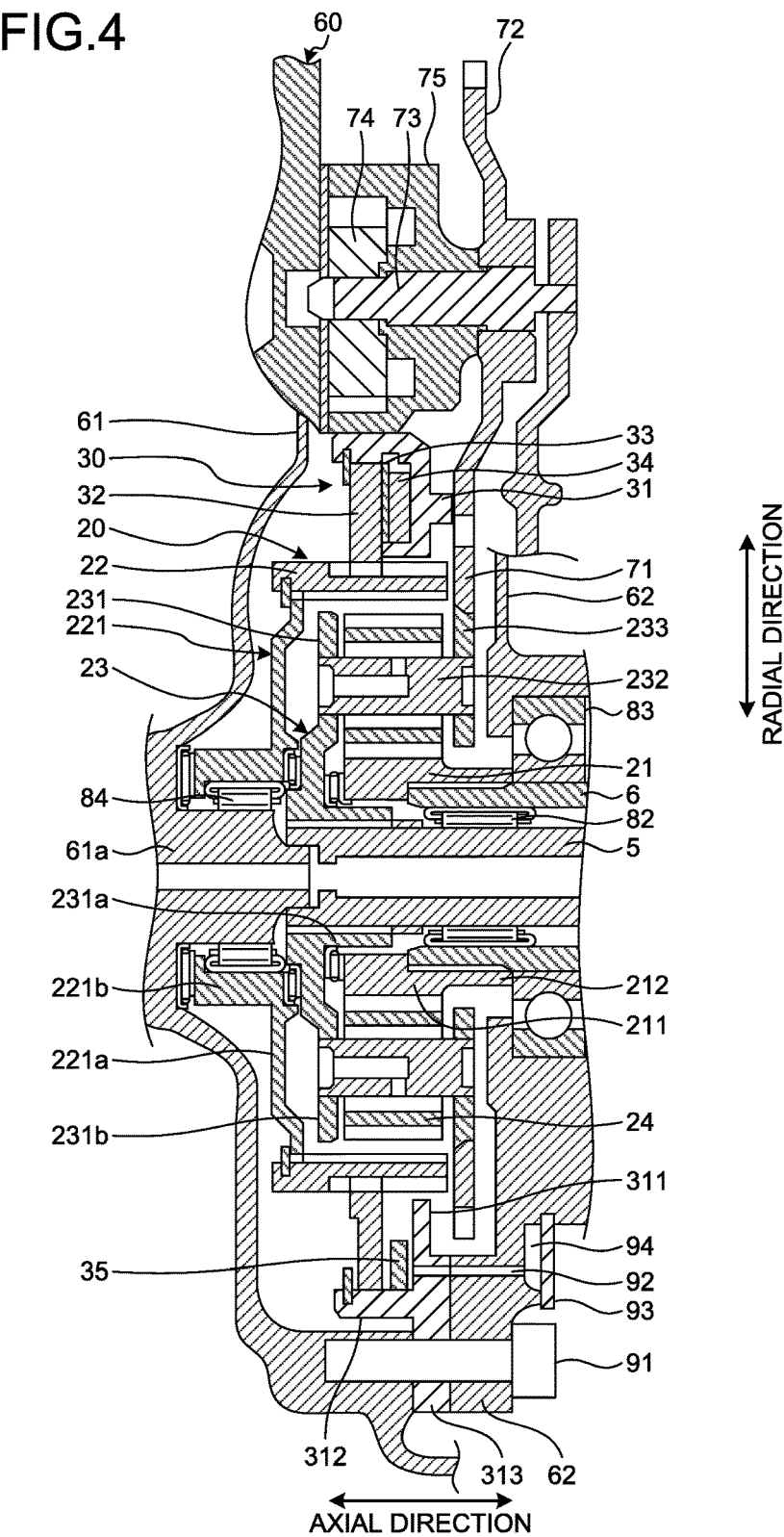
FIG. 4 is a cross-sectional view schematically illustrating a peripheral structure of a second differential mechanism inside a case.

FIG. 4 is a cross-sectional view schematically illustrating a peripheral structure of the second differential mechanism 20 in the drive unit 100. As illustrated in FIG. 4, the pump drive gear 71 is formed integrally with the outer periphery of the carrier plate 233. The pump shaft 73 is attached with the pump rotor 74 on the side of the rear cover 61 and attached with the pump driven gear 72 on the side of the engine 1, and is rotatably supported by the center support 62. That is, the pump body 75 is formed as a separate body from the center support 62. Further, in the axial direction, the pump rotor 74, the SOWC 30, and the second differential mechanism 20 are arranged at positions overlapped on each other.

In the second embodiment, instead of the needle bearing 81 according to the first embodiment, a needle bearing 84 attached to the rear cover 61 is provided. As illustrated in FIG. 4, the ring gear flange 221 is supported by a boss portion 61a of the rear cover 61 via the needle bearing 84, which is a radial bearing. That is, the second ring gear 22 is supported by the rear cover 61 via the ring gear flange 221 and the needle bearing 84.

In the second embodiment, the radial load acting on the second ring gear 22 from the SOWC 30 is received by the needle bearing 84 (the rear cover 61) via the ring gear flange 221. Therefore, the ring gear flange 221 is arranged between the rear cover 61 and the second sun gear 21 (the second carrier 23) in the axial direction. Further, the portion where the second ring gear 22 and the ring gear flange 221 are spline-fitted to each other (a spline-fitted portion) is located on the side of the rear cover 61 in the axial direction with respect to the portion where the second ring gear 22 and the second pinion gear 25 engage with each other (an engaging portion).

More specifically, the flange portion 221a is arranged between the rear cover 61 and the carrier main body 231 of the second carrier 23 in the axial direction. One surface (a surface on the side of the engine 1) of the flange portion 221a faces a side surface of the carrier main body 231 in the axial direction, and the other surface (a surface opposite to the engine 1) of the flange portion 221a faces a wall surface of the rear cover 61 in the axial direction. An outer race of the needle bearing 84 is fitted to the boss portion 221b. The boss portion 61a of the rear cover 61 protrudes toward the input shaft 5 in the axial direction, and an end portion of the boss portion 61a is inserted into (fitted to) the inside of the input shaft 5.

As described above, in the drive unit 100 according to the second embodiment, because the ring gear flange 221 is supported by the rear cover 61 via the needle bearing 84, the radial load generated in the SOWC 30 can be received by the needle bearing 84 and the rear cover 61. Accordingly, the misalignment of the second carrier 23 due to the radial load can be suppressed, and the occurrence of noise and vibration can be suppressed in the second differential mechanism 20.

In the respective embodiments described above, cases are described where the needle bearings 81 and 84 are provided as a radial bearing that receives the radial load generated in the SOWC 30. However, as a modified example thereof, in the drive unit 100, the radial bearing may be formed by a sliding bearing (a bush).

In the embodiments described above, cases are described where the ring gear flange 221 and the second ring gear 22 are formed as separate members and spline-fitted to each other. However, as a modified example thereof, the drive unit 100 may include a ring gear flange formed of a member integrally molded with the second ring gear 22.

According to an embodiment of the present disclosure, in the drive unit of a hybrid vehicle, when the rotation of a ring gear is regulated by a selectable one-way clutch, noise and vibration of a second differential mechanism having the ring gear can be reduced.

According to an embodiment of the present disclosure, the ring gear flange of the second differential mechanism is supported by the rotor shaft of the electric motor via the radial bearing. Therefore, when rotation of the ring gear of the second differential mechanism is regulated by the selectable one-way clutch, the radial load generated in the selectable one-way clutch can be received by the radial bearing and the rotor shaft. Accordingly, noise and vibration of the second differential mechanism can be decreased.

According to an embodiment of the present disclosure, the pump rotor and the second differential mechanism are arranged at different positions in the axial direction. Therefore, it is possible to create a space radially outside of the second differential mechanism and the selectable one-way clutch inside the case. Accordingly, the radial size of the selectable one-way clutch can be increased, thereby enabling to improve the durability of the selectable one-way clutch.

According to an embodiment of the present disclosure, the pump drive gear is not arranged radially inside of the selectable one-way clutch. Therefore, the oil path that supplies lubricant oil to the selectable one-way clutch can be provided radially inside of the outer periphery of the pump drive gear. Accordingly, at the time of supplying the lubricant oil to the rotating selectable one-way clutch, while supply pressure is set to the supply pressure exceeding an internal pressure due to a centrifugal force, because the oil path is located radially inside, the supply pressure of the lubricant oil can be reduced, thereby enabling to reduce a loss. Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drive unit of a hybrid vehicle, comprising:
   an engine;
   an electric motor;
   a first differential mechanism;
   a second differential mechanism;
   a selectable one-way clutch; and
   a case accommodating the electric motor, wherein
   the first differential mechanism includes a first rotational element coupled to the electric motor, a second rotational element coupled to the engine, and a third rotational element that outputs power toward drive wheels,
   the second differential mechanism includes a sun gear coupled to the electric motor, a carrier coupled to the engine, a ring gear whose rotation is regulated by the selectable one-way clutch, and a ring gear flange that rotates integrally with the ring gear, and
   the selectable one-way clutch is configured to switch a state thereof between a locked state in which a rotation direction of the ring gear is regulated in one direction and an unlocked state in which the ring gear is allowed to rotate in both directions, and
   the ring gear flange is supported by a rotor shaft of the electric motor via a radial bearing.

2. The drive unit according to claim 1, further comprising:
an oil pump that is arranged on an axis different from an axis of the engine and is driven by the engine; and
a center support that is fixed to the case to support the rotor shaft rotatably, wherein
the oil pump includes
- a pump body that is integrally formed with the center support,
- a pump rotor that is accommodated in the pump body and is located at a position different from a position of the second differential mechanism in an axial direction,
- a pump driven gear that is located on an opposite side to the engine with respect to the second differential mechanism in an axial direction and rotates integrally with the pump rotor, and
- a pump drive gear that is engaged with the pump driven gear and rotates integrally with the carrier.

3. The drive unit according to claim 2, further comprising an oil path that passes through the center support to supply a lubricant oil into the selectable one-way clutch, wherein
the pump drive gear is located at a position different from a position of the selectable one-way clutch in the axial direction, and
the oil path is provided radially inside of the pump drive gear with respect to an outer periphery part of the pump drive gear.

* * * * *